United States Patent [19]
Charamel et al.

[11] 3,712,430
[45] Jan. 23, 1973

[54] VEHICLE CURRENT COLLECTOR BALANCED SUPPORT

[75] Inventors: Pierre Charamel, Les-Cotes-de-Sassenage; Hubert Ligones, Saint-Egreve, both of France

[73] Assignee: Merlin Gerin, Societe Anonyme, Rue Henri Tarze, France

[22] Filed: Jan. 11, 1971

[21] Appl. No.: 105,300

[30] Foreign Application Priority Data
Dec. 14, 1970 France..................................7045086

[52] U.S. Cl.........................191/45 R, 191/49, 191/65
[51] Int. Cl. ..............................................B60l 5/00
[58] Field of Search......191/45, 45 A, 49, 50, 59, 65, 191/64, 48, 45 R

[56] References Cited
UNITED STATES PATENTS

3,152,673  10/1964  Duffy......................................191/45
3,405,240  10/1968  Kilburg...............................191/45 R Primary Examiner—Gerald M. Forlenza
Assistant Examiner—Richard A. Bertsch
Attorney—Stevens, Davis, Miller & Mosher

[57] ABSTRACT

Current collecting device for a high speed vehicle comprising a collector head mechanically connected to the vehicle by an articulated system which permits relative displacement of the collector head with respect to the vehicle. The articulated system comprises a balancing device including a spring for counterbalancing vertical motion and a mass counterbalancing of lateral motion to maintain equilibrium regardless of the position of the collector head.

14 Claims, 2 Drawing Figures

VEHICLE CURRENT COLLECTOR BALANCED SUPPORT

The invention relates to a device for supplying current to a vehicle capable of traveling over a track, and especially for feeding a linear electric propulsion motor for operating with ground effect. The ravel system includes feed conductors and current collectors in the form of rails which extend virtually parallel to each other along the propulsion track and are arranged with respect to each other in such a way as to define a current conducting track capable of mechanically guiding, by means of current collecting brushed in contact with the rails, a support shuttle or collector head for the brushes. The apparatus also includes a system of articulated levers connected mechanically to the shuttle of the aforementioned vehicle which is capable of transmitting a tractive force to the shuttle and compensates for the lateral and vertical variations in position in the position of the shuttle and of the vehicle which are respectively guided by the collecting track of the propulsion track.

Current collecting devices of the same general type as disclosed herein have already been suggested, especially in the French application of the 4th addition No. 70 33176, filed Sept. 11, 1970, in which the connection between the current collecting shuttle and the vehicle being supplied with current is obtained by articulated systems of the pantograph type which permit relative displacement of the shuttle with respect to the vehicle. The aforementioned devices permit different filtering arrangements of the forces transmitted to the shuttle, guided in its movement by the current collectors in such a way as not to disturb the equilibrium of the shuttle. The devices of this kind are conceived particularly for supplying current to linear electric propulsion motors of vehicles which are sustained by ground effect and which travel at high speed, for example at several hundreds of kilometers an hour and in which the relative movements of the vehicle with relation to the propulsion track, especially the lateral and vertical displacements, are particularly important. It has been ascertained that at the high speeds attained by these vehicles the devices known at present do not permit perfect filtering of forces and they transmit to the shuttle lateral or vertical components which occasion different or unequal attrition of the brushes in contact with the feed conducting rails.

The purpose of the present invention is to overcome the disadvantages of the aforementioned devices and to permit the realization of a connecting device between a vehicle and a current-collecting shuttle, in which only the component of the propulsion force is transmitted by the vehicle to the shuttle.

The device for supplying current in accordance with this invention is characterized by the fact that it consists of a virtually vertical shaft with one end attached to the shuttle by an articulation; the other end consists of an element of the system with articulated levers having axes of articulation parallel to the general direction of the tracks so that the articulated levers extend and move about in planes virtually orthogonal to the tracks. The device also includes a balancing device capable of maintaining equilibrium without regard to the shuttle assembly and the system of levers for all positions of the shuttle relative to the vehicle, near the normal position of operation.

Another purpose of the invention is to realize a system of articulated levers which will put into action only the fixed or mobile articulations, to the exclusion of all other relative displacement, for example the cam. The collection devices are exposed to atmospheric conditions, and it has been established that reliable operation can not be assured except by mechanical systems which are particularly simple and can be easily maintained.

This invention has likewise as its purpose the compensation, in all positions, of the weight of the shuttle which bears the mechanism for collection of current, which weight is not at all negligible. The invention emanates from the statement that every movement of the shuttle in a plane extending transversely with respect to the general direction of travel, can be broken up into a vertical or a lateral movement. Counterbalancing the weight of the shuttle can be preserved by incorporating compensating systems in the system of articulated levers, the purpose of one system being the counterbalancing of upward and downward motion and the other being the counterbalancing of lateral motion. It is understood that the combination of these two devices will permit the maintenance of equilibrium regardless of the position of the shuttle with respect to the vehicle.

According to the development of the invention, the vertical counterbalancing device includes a counterbalancing spring anchored at a fixed point on the middle of a small rod with its extremities articulated respectively to a pivot lever and at an extension parallel to and opposed to the latter by one of the articulated levers, in such a way as to modify the line of action of the spring and to maintain constant support couple for the shuttle in all horizontal positions.

According to another development of the invention, the lateral equilibrium device includes a bar mounted so that it can pivot; and parallel to the vertical bar in the normal position, there is a mechanical connection with the system of articulated levers making the pivoting bar pivot proportionally to the pivoting of the vertical bar for holding the shuttle, and a system which cooperates with the bar pivoting in such a way as to balance the weight of the shuttle in all lateral positions of the latter.

On winding routes the effect of centrifugal force acting on the shuttle impels the latter to press against the rails exterior to the bend, which submits them to the accrued efforts resulting from wear and injurious disequilibrium.

According to a development of the invention, the weight balancing device of the shuttle, in case of lateral displacement, includes a solid arranged in such a way that the centrifugal forces applied to this solid compensates automatically the forces acting on the shuttle.

The variations in position of the shuttle with respect to the vehicle result on the one hand from variations in the deviations of the current feeding track with respect to the propulsion route, and from deviations of the vehicle with respect to the latter, which variations present notable amplitudes but of elevated period, and on the other hand by variations imposed on the shuttle by imperfections in the current feeding track, which are variations of weak amplitude but generally of high frequency.

According to the invention, the system of articulated levers compensates for the variations first mentioned while an elastic system, arranged by example in the zone of attachment of the shuttle to the support rod, permits recovery from the second mentioned variations.

The assembly of articulated levers is of course housed inside a compartment for support and protection, the external profile of the compartment being streamlined to diminish the drag on the vehicle.

Other advantages and characteristics of the invention will be apparent from the description which follows and which shows the invention in operation by way of example, which is not limited, and is represented by the attached drawings, in which.

Figure 1:
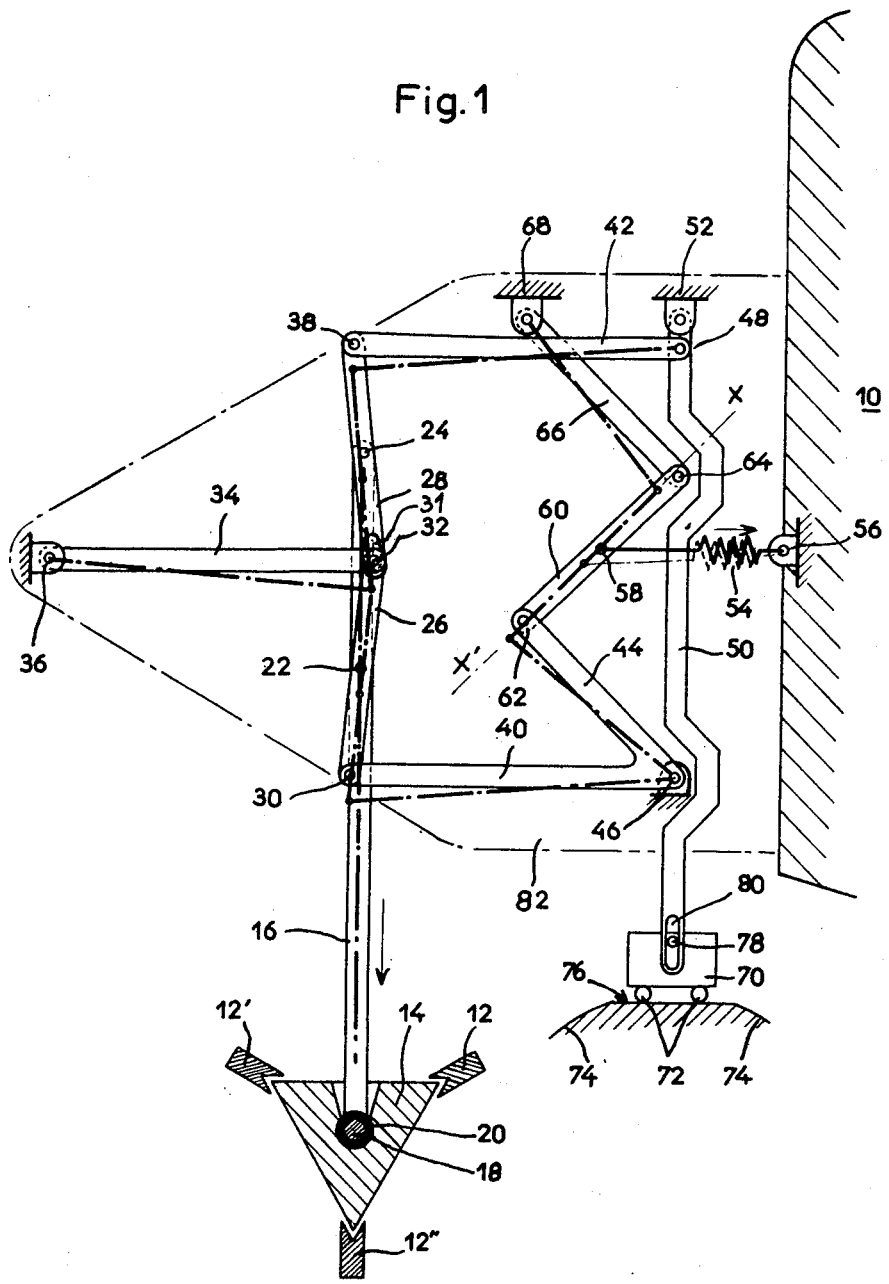
FIG. 1 is a schematic view, in elevation at a distorted scale, of a system of articulated levers according to the invention, which is shown in a normal intermediate position by line drawing, and the position taken by the different levers in case of vertical shifting relative to the shuttle in a downward direction is marked by the shafts with composite axes.

In the figures, a vehicle 10 which is held in suspension by a cushion of compressed air which is developed between the bottom of the vehicle and the propulsion route (not shown) is propelled by a linear electric motor (not shown), the induced part of which is generally constituted by a projecting plate (not shown) of the guiding track of the vehicle. Parallel to the guiding track of the vehicle 10 there is extended a collecting track, or an intake of current connection, consisting of three feed conductors in the form of rails 12, 12', 12'', arranged in such a manner as to define the groove, on the interior of which a component in the form of a shuttle slides and carries brushes for intake of current (not shown), and is incited elastically to contact the associated rails 12, 12' 12''. The feeding device, or intake of current device, is of a type of self-guided shuttle described in the aforementioned application for patent, which may be referred to for more complete details.

The current collecting shuttle, or collector head, 14 is articulated to the end of a vertical bar 16 by the medium of a universal joint 18 composed of elastic parts 20, capable of permitting small displacements of the shuttle with relation to bar 16. Joint 18 can likewise consist of two concentric sockets, one bound to bar 16 and the other bound to the body of shuttle 14, the space between the two sockets being filled with an elastic substance such as rubber. The swivel or articulation 18 is advantageously positioned to the center of symmetry or the center of pull of shuttle 14. Bar 16 extends in a virtually vertical direction and is articulated at two of its points 22 and 24 located in the middle of the small rods 26 and 28.

One end of each of the small bars 26 and 28 is articulated at 32 to an oscillating lever 34 which is mounted to swivel on the fixed point 36, the term "fixed" being used in the sense that the point is integral to vehicle 10. The small rod 28 has at the right of joint 32 an opening 31 which permits a small displacement of the small rod 28 with relation to joint 32 in case of lateral displacement, which is more particularly described later herein in reference to FIG. 2. The opposite ends 30 and 38 of small rods 26 and 28 are respectively articulated to the oscillating levers 40 and 42 which extend parallel to each other and in the direction opposite to lever 34 relative to the vertical bar 16. The oscillating lever 40 has an extension 44 to form a bell crank lever mounted to pivot on the fixed point 46. The end of oscillating lever 42 is articulated at 48 on a bar extending virtually parallel to the vertical bar 16, and mounted to pivot on its end upon the fixed point 52. The different levers mentioned above preferably consist of pairs of parallel levers spaced in such a way as to facilitate their articulation and to augment the rigidity of the articulated system.

Before describing in greater detail the different balancing arrangements according to the invention, the functioning of the aforementioned articulated system will be briefly described. In case of a variation in level between the propulsion route and the collecting track 12, 12', 12'', shuttle 14, for example, is impelled to change position toward the bottom as seen in FIG. 1. A change in position of rod 16 attendant upon the lowering of shuttle 14 changes the position of points 22 and 24 of the small rods 26 and 28 towards the bottom by imposing a pivoting of lever 34 around joint 36. In this displacement, the point of articulation 32 describes a circumference with center 36. In a similar manner points 30 and 38 describe circumferences of inverse curvature with respect to the centers 46 and 48. It is easy to see that since the length of levers 34, 40 and 42 are virtually identical, points 24 and 22 describe virtually a trajectory defined by the axis of bar 16, which is in descending motion maintained practically on its axis. Such a movement is well known in mechanics by the name "three-bar movement."

Figure 2:
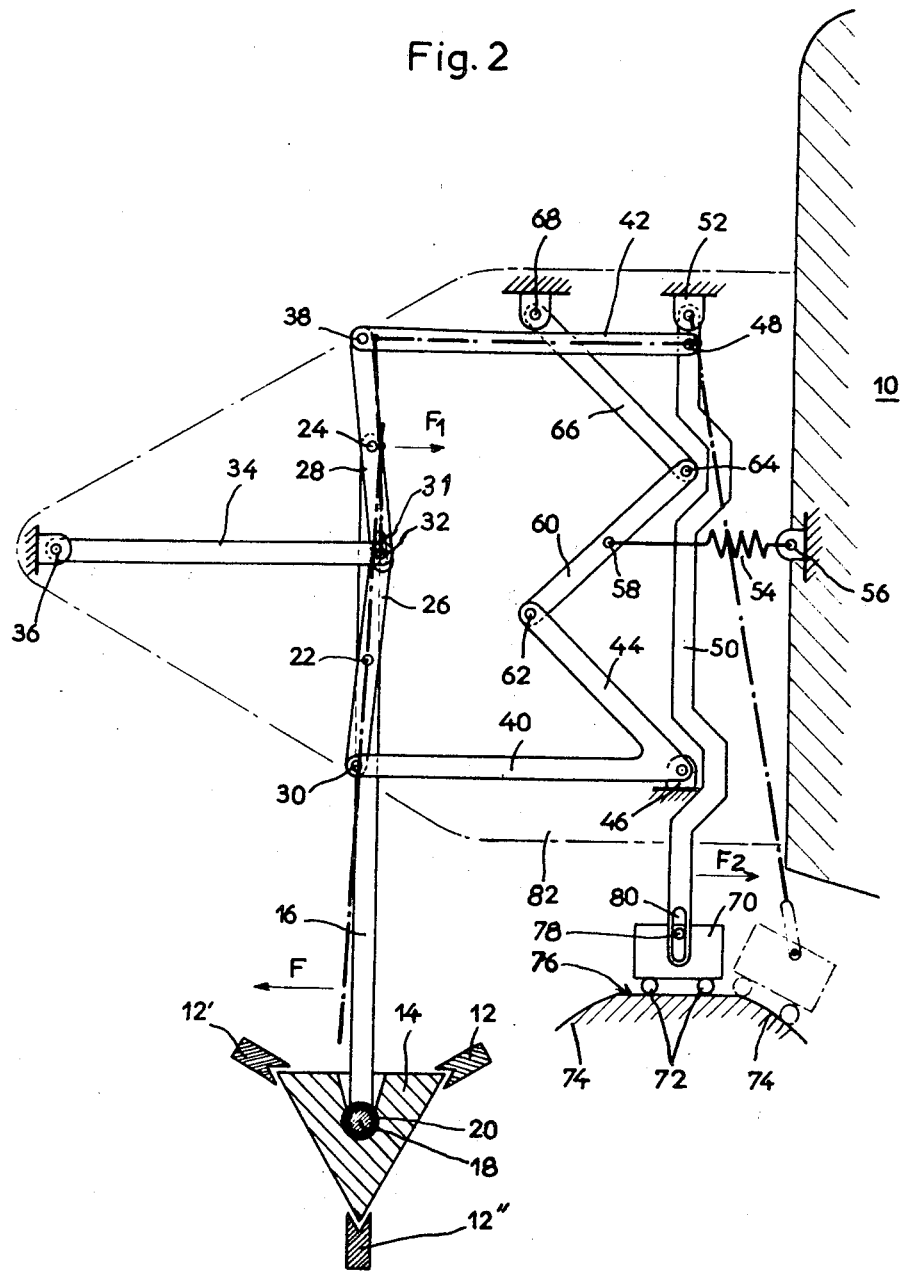
FIG. 2 is a view analogous to FIG. 1 showing by composite line the positions of the different levers in case of lateral shifting in the direction of arrow F of the shuttle with relation to the vehicle.

In case of lateral displacement of shuttle 14, for example in the direction indicated by arrow F in FIG. 2, bar 16 is led to pivot around the point of articulation 22, which is held in place by the oscillating levers 34 and 40, a pivoting which provokes a displacement in the direction of arrow $F_1$ from point 34 and from the end 38 permitted by opening 31. This transfer of articulation 38 is transmitted by lever 42 to point 48, which imposes on bar 50 a pivoting around the fixed joint 52, displacing bar 50 in the direction of arrow $F_2$ opposed to the displacement of rod 16.

The balancing device for the weight of shuttle 14 during a vertical movement is realized by a draw-spring 54 anchored to the fixed point 56 and on its opposite end to the middle 58 of a small rod 60, one of the ends of which is articulated at 62 to extension 44, and the other end is articulated at 64 to a pivoting lever 66 which extends parallel to extension 44 in the normal position represented by FIG. 2, lever 66 being mounted to pivot at the fixed point 68. The assembly of levers 44, 66 and little rod 60 constitute an articulated system called "three-bar system" analogous to the aforementioned device, and it is easy to see that during a pivoting movement of lever 40 and of its end 44 around articulation 46, point 58 is led to move in virtually a straight line marked on FIG. 1 by X and X'. The displacement of point 58 modifies the line of action of spring 54 and permits compensation for the increase or decrease in the force of the spring resulting from a shortening or a prolongation of spring 54. The system consisting of spring 54 and short rod 60 permits compensation for the weight of shuttle 14 in all vertical positions.

The system for compensation in case of lateral displacement consists of a solid 70 which is capable of changing position, for example with the aid of support rollers 72 along a convex gradient 74 which has its median part in the form of a horisontal level 76. Solid 70 has a stub 78 engaged in vertical opening 80 cut at the end of bar 50, for example in the direction of arrow $F_2$ which leads solid 70 along ramp 74 on the gradient, the force of gravity tending then to accentuate the pivoting in the direction F. The resulting torque can be determined in a way to compensate exactly the torque exercised by shuttle 14 due to lateral displacement in the direction of arrow F.

On a curve, shuttle 14 and solid 70 are submitted to centrifugal forces proportionate to their masses and they are exercised in the same direction. For an appropriate choice of solid and of lever arms it is possible to obtain perfect compensation of the torque resulting from the aforementioned centrifugal forces. It is understood that the solid system 70, which is mobile on gradient 74 can be replaced, for example by a pendulum system. The fixed gradient 74 is integral with vehicle 10.

The assembly of joints of the lever system described above consists of horizontal axes extending parallel to the line of movement of the vehicle. The pivot joints 36, 46, 52 and 68, called fixed, are understood to have axes integral with a support beam schematically represented in 82 fastened to the lateral wall of the vehicle 10 and standing out laterally from the latter. Beam 82 is advantageously arranged in a hollow housing for protection and for enclosing the assembly of articulated levers, the exterior profile of this housing being stream-lined to diminish the drag.

The support device according to the invention functions in the following manner:

In case of relative displacement of shuttle 14 with relation to vehicle 10 being effected in a vertical direction, for example towards the bottom indicated by the arrow in FIG. 1, it is easy to see that the vertical bar 16 pulls then, by its lowering, the articulation points 22 and 24 which impose on the small rods 26 and 28 a pivoting which is transmitted to levers 34, 40 and 42, which have just taken the position indicated in the composite drawing, FIG. 1. Articulation 32 describes a circumference with center 36 with curvature oriented toward axis 36, while articulations 30 and 38 describe circumferences with centers respectively 46 and 48 having inverse curvature. Calculation or the diagrams can show that bar 16 carried by points 22 and 24 describes in this case virtually a line of movement downward of the bar effected practically without any lateral displacement. Lever 40 with extension 44 pivots around the fixed point 46 and imposed on small rod 60 a displacement represented by the composite drawing in FIG. 1. This displacement is translated by a displacement of the anchor point of spring 54 on axis X–X' downward and toward the left of the figure which modifies the length of the spring and the line of application of force by the spring, and the relations of the levers are adjusted in such a way as to maintain constant connection capable of balancing in all positions the weight of shuttle 14. A displacement upward provokes, of course, a symmetrical deformation of the articulated system by the shortening of spring 54, and from this fact there is a decrease in the applied force, which is accompanied by a displacement upward of the anchorage point 58 which increases the lever arm so that it maintains a constant connection.

Referring to FIG. 2, it is seen that lateral displacement of shuttle 14 with relation to vehicle 10 provokes a pivoting of bar 16 around articulation 22 which is held in place by levers 34 and 40. This displacement or pivoting around joint 22 provokes a displacement toward the right indicated by the arrow $F_1$ in FIG. 2 in case of displacement toward the left indicated by arrow F of shuttle 14. This displacement which is imposed on joint 24 is transmitted by joint 38 and lever 42 to the point of articulation 48 which provokes a pivoting of the compensation bar 50 around its pivot 52. It is evident from FIG. 2 that a displacement of bar 16 towards the left in the direction of arrow F implies a displacement of bar 50 toward the right in the direction of arrow $F_2$. The displacement of bar 50 draws the solid or carriage 70 through the medium of opening 80 and stub 78 along the gradient 74 or under the effect of its weight it tends to slide towards the bottom and towards the right of the figure. It is easy to see that the torque exercised by weight 70 is exercised in a direction opposed to the torque caused by shuttle 14 being off center, the relations between the solids and the lever arms being judiciously chosen in such a way as to realize perfect balance.

A composite displacement can of course be distorted into a vertical displacement and a lateral displacement, provoking a distortion in the system of articulated levers, which places into operation the compensation devices by spring 54 and the compensation device by solid 70 in such a way that shuttle 14 is maintained in neutral balance at all points.

The invention is of course not at all limited to the method of operation described in detail and represented by way of example in the attached drawings, but it extends quite to the contrary to all other variants within the framework of mechanical equivalents.

What is claimed is:

1. A mechanism for use with a high speed vehicle movable along a trackway to drive and support a current collecting head guided in a longitudinal current supplying passageway extending parallelly to said trackway, said mechanism comprising rod means extending substantially transversely of the longitudinal direction of said passageway and having an end swingable connected to said collector head, linkage means pivotally connected to a portion of said rod means spaced apart from said end and adapted for connection to said vehicle to drive said collector head along said passageway, said linkage means extending substantially perpendicularly to said longitudinal direction and being adapted to permit said rod means to execute small translational and oscillating movements perpendicularly to said longitudinal direction, and balance means connected to said linkage means and tending to maintain said collector head substantially in neutral equilibrium in said passageway for all positions of said collector head adjacent the mean normal operating position thereof.

2. A mechanism according to claim 1, further comprising inertia means free to move transversaly of said longitudinal direction and operatively connected to said linkage means to compensate the effect of centrifugal forces acting upon said collector head.

3. A mechanism according to claim 1, said balance means comprising resilient bias means.

4. A mechanism according to claim 3, said resilient bias means comprising spring mean adapted for connection to said vehicle.

5. A mechanism according to claim 1, said linkage means comprising a plurality of substantially coplanar rods pivotally connected to one another.

6. A mechanism according to claim 5, said plurality of rods comprising a first pair of pivoting rods, pivot mean movably connecting together a first end of the pivoting rods of said first pair, a second pair of pivoting rods extending transversaly of the lengthwise direction of the rods of said first pair, respectively, and pivotally connected to the opposite end of the respective pivoting rod of said first pair to permit small longitudinal and angular movements thereof, said portion of said rod means having a pair of pivots spaced apart transversaly of said longitudinal direction to pivotally connect said rod means to a pivot center intermediate the ends of the pivoting rods of said first pair, respectively, and guide means for said pivot means to permit said longitudinal and angular movements of said pivoting rods of said first pair, said balance means comprising bias means connected to at least one pivoting rod of said second pair to counteract the effect of the weight of said collector head on said rod means.

7. A mechanism according to claim 6, said pivot means cooperating with lost motion means to permit said angular movements.

8. A mechanism according to claim 6, said guide means comprising a swinging rod extending transversaly of said rod means.

9. A mechanism according to claim 6, said balance means comprising motion amplifying mean operatively connected to one of the pivoting rods of said second pair to tend to maintain said collector head substantially in neutral equilibrium after angular movement of said rod means responsive to lateral deviation of said collector head.

10. A mechanism according to claim 6, further comprising pendulum means free to swing in a plane transverse of said longitudinal direction and operatively connected to at least one of the pivoting rods of said second pair to compensate the effect of centrifugal forces acting upon said collector head.

11. A mechanism according to claim 9, said pendulum means comprising a swinging lever extending substantially parallel to said rod means and having a first end pivotally connected to a fulcrum adapted for connection to said vehicle and a second end connected through lost motion means to a mass, said one pivoting rod of said second pair being pivotally connected to said swinging lever intermediate the ends thereof, said balance means further comprising guide means for said mass causing amplification of the lateral deviation of said swinging lever subsequent to angular movement of said rod mean responsive to lateral deviation of said collector head with respect to said vehicle so as to maintain said collector head substantially in neutral equilibrium after said lateral deviation thereof.

12. A mechanism according to claim 6, said balance means comprising reducing motion means cooperating with a mass guided for movement transversaly of said longitudinal direction.

13. A mechanism according to claim 12, said balance means comprising a cam surface adapted for connection to said vehicle to guide said mass.

14. A mechanism according to claim 12, said reducing motion device comprising a swinging lever extending substantially parallel to said rod means and having a first end pivotally connected to a fulcrum adapted for connection to said vehicle and a second end connected to said mass, one of the pivoting rods of said second pair being pivotally connected to said swinging lever intermediate the ends thereof.

* * * * *